(12) United States Patent
Peterson et al.

(10) Patent No.: US 7,441,910 B1
(45) Date of Patent: Oct. 28, 2008

(54) VEHICULAR PIVOT MIRROR

(75) Inventors: Kenneth C. Peterson, Comstock Park, MI (US); Ian Boddy, Ada, MI (US); Keith D. Foote, Kentwood, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 0 days.

(21) Appl. No.: 11/160,615

(22) Filed: Jun. 30, 2005

Related U.S. Application Data

(60) Provisional application No. 60/521,763, filed on Jun. 30, 2004.

(51) Int. Cl.
*G02B 5/08* (2006.01)
*G02B 7/182* (2006.01)
*B60R 1/06* (2006.01)

(52) U.S. Cl. .................. 359/841; 359/873; 359/877
(58) Field of Classification Search ................ 359/841, 359/872, 873, 877
See application file for complete search history.

(56) References Cited

U.S. PATENT DOCUMENTS

| | | | |
|---|---|---|---|
| 2,856,816 A | 10/1958 | Ross | |
| 2,903,210 A | 9/1959 | Cousins | |
| 3,189,309 A | 6/1965 | Hager | |
| 3,282,549 A | 11/1966 | Crawford | |
| 3,667,718 A | 6/1972 | Goslin et al. | |
| 4,165,156 A | 8/1979 | O'Connell | |
| 4,258,894 A | 3/1981 | Niggemann | |
| 4,315,614 A | 2/1982 | Stegenga et al. | |
| 4,558,930 A | 12/1985 | Deedreek | |
| 4,598,982 A | 7/1986 | Levine | |
| 4,605,289 A | 8/1986 | Levine et al. | |
| 4,623,115 A * | 11/1986 | Brester | 248/479 |
| 4,711,538 A | 12/1987 | Ohs et al. | |
| 4,728,181 A * | 3/1988 | Kakinuma | 248/549 |
| 4,753,410 A | 6/1988 | Dyer | |
| 4,789,232 A * | 12/1988 | Urbanek | 248/549 |
| 4,892,400 A | 1/1990 | Brookes et al. | |
| 4,892,401 A | 1/1990 | Kittridge et al. | |
| 4,921,337 A | 5/1990 | Hou | |
| 4,969,727 A | 11/1990 | Harloff | |
| 5,007,724 A | 4/1991 | Hou | |
| 5,096,283 A | 3/1992 | Croteau | |
| 5,110,196 A | 5/1992 | Lang et al. | |
| 5,124,847 A | 6/1992 | Gong | |
| 5,210,655 A | 5/1993 | Mishali | |
| 5,225,943 A | 7/1993 | Lupo | |
| 5,337,190 A | 8/1994 | Kogita et al. | |
| 5,375,014 A | 12/1994 | Fujie et al. | |
| 5,383,057 A * | 1/1995 | Kimura et al. | 359/841 |
| 5,477,390 A | 12/1995 | Boddy et al. | |
| 5,477,392 A * | 12/1995 | Mochizuki et al. | 359/841 |
| 5,483,385 A | 1/1996 | Boddy | |
| 5,546,239 A | 8/1996 | Lewis | |
| 5,604,644 A | 2/1997 | Lang et al. | |
| 5,684,646 A | 11/1997 | Boddy | |

(Continued)

*Primary Examiner*—Ricky D Shafer
(74) *Attorney, Agent, or Firm*—McGarry Bair PC

(57) ABSTRACT

A vehicular pivot mirror assembly comprises a reflective element assembly pivotably attached to a support arm to enable rotation of the reflective element assembly relative to the support arm about a pivot connection. A positioning assembly enables rotation of the reflective element assembly in response to a rotational force applied to the reflective element assembly and prevents rotation of the reflective element assembly when the rotational force is removed.

8 Claims, 20 Drawing Sheets

U.S. PATENT DOCUMENTS

| | | |
|---|---|---|
| 5,969,890 A | 10/1999 | Whitehead |
| 6,024,459 A | 2/2000 | Lewis |
| 6,213,609 B1 * | 4/2001 | Foote et al. .................. 359/841 |
| 6,361,179 B1 * | 3/2002 | Miyabukuro ................ 359/879 |
| 6,439,730 B1 | 8/2002 | Foote |
| 6,505,944 B1 | 1/2003 | Lewis |
| 6,598,983 B1 | 7/2003 | Boddy |
| 6,648,481 B2 | 11/2003 | Lewis |
| 6,672,726 B1 * | 1/2004 | Boddy et al. ................ 359/841 |
| 6,799,856 B2 | 10/2004 | Foote et al. |
| 6,820,987 B1 | 11/2004 | Lewis |
| 6,896,385 B2 | 5/2005 | Foote |
| 2004/0165295 A1 | 8/2004 | Lewis |
| 2005/0030652 A1 | 2/2005 | Lewis |

* cited by examiner

VEHICULAR PIVOT MIRROR

CROSS-REFERENCE TO RELATED APPLICATION

This application claims the benefit of U.S. provisional application Ser. No. 60/521,763, filed Jun. 30, 2004, which is incorporated herein in its entirety.

FIELD OF THE INVENTION

The invention relates generally to rearview mirrors for motor vehicles and more particularly to a vehicular rearview mirror which can be pivoted from a horizontal inboard position to a vertical outboard position.

DESCRIPTION OF THE INVENTION

External rearview mirrors are ubiquitous for conventional motor vehicles. Such mirrors are frequently adapted to be adjusted by the vehicle operator at preselected positions. For example, external rearview mirrors can be selectively folded against the vehicle when not in use, and folded away from the vehicle for use, or extended laterally away from the vehicle (the "outboard" position) to adjust the rearward view during towing of a trailer, and retracted toward the vehicle (the "inboard" position) during non-towing operation. Mirrors can also be extended and retracted between the inboard and outboard positions by rotating the mirror about an axis which is offset from the center point of the reflective element and perpendicular thereto. Examples of prior art rotatable mirrors include U.S. Pat. Nos. 5,546,239, 6,024,459, 6,505,944, and 6,648,481 to Lewis.

SUMMARY OF THE INVENTION

A vehicular mirror assembly comprises a reflective element assembly, a support arm for supporting the reflective element assembly, a pivot connection connecting the reflective element assembly to the support arm and enabling the reflective element assembly to be rotated between a first position and a second position relative to the support arm, the pivot connection including a retainer which prevents axial movement of the reflective element assembly relative to the support arm, and a clutch assembly interposed between the reflective element assembly and the support arm for maintaining the reflective element assembly in one of the first position and the second position and permitting rotation of the reflective element assembly relative to the support arm between the first and second positions.

The pivot connection can comprise a pair of juxtaposed bearing sleeves associated with a respective one of the support arm and the reflective element assembly. The pair of juxtaposed bearing sleeves is made from a low-friction material.

The retainer can comprise a press-fit ring received on one of the support arm and the reflective element assembly and encapsulating the pair of juxtaposed bearing sleeves between the retainer and the other of the support arm and the reflective element assembly.

In one embodiment, the clutch assembly comprises a detent offset from an axis of rotation of the reflective element assembly relative to the support arm on one of the reflective element assembly and the support arm and a biased member in register with the detent on the other of the reflective element assembly and the support arm, wherein the biased member is received by the detent when the support arm is located in one of the first and second positions. The support arm can further comprise a stop in register with the other of the first and second positions, wherein the stop defines an end-of-travel position for the reflective element assembly with respect to the support arm. The biased member can comprise a ball biased into the detent by a spring.

In another embodiment, the clutch assembly comprises a pinion associated with one of the reflective element assembly and the support arm and a rack associated with the other of the reflective element assembly and the support arm, wherein the pinion engages the rack during pivoting of the reflective element assembly between the first and second positions. The pinion can comprise a shaft mounted to the pinion and a shaft retainer mounted to the one of the reflective element assembly and the support arm, wherein the shaft retainer axially receives the pinion shaft and is adapted to prevent rotation of the pinion shaft with respect to the shaft retainer until a preselected level of friction between the pinion shaft and the shaft retainer is overcome, whereby the preselected friction level prevents unintended rotation of the reflective element assembly with respect to the support arm. The shaft retainer can further comprise a plurality of radially spaced fingers which axially receive the pinion shaft and a spring encircling the plurality of fingers to apply the desired friction level to the pinion shaft when the pinion shaft is received within the plurality of fingers.

In yet another embodiment, the clutch assembly comprises a threaded shaft associated with one of the reflective element assembly and the support arm and a follower nut received on the threaded shaft and associated with the other of the reflective element assembly and the support arm, wherein linear movement of the follower nut along the threaded shaft is translated into pivotal movement of the reflective element assembly with respect to the support arm. A motive-producing element can be connected to the threaded shaft for introducing rotation to the threaded shaft, and causing the nut follower to travel along the threaded shaft. The clutch assembly can further comprise a slip clutch located between the threaded shaft and the motive-producing element.

DESCRIPTION OF AN EMBODIMENT OF THE INVENTION

Figure 1:
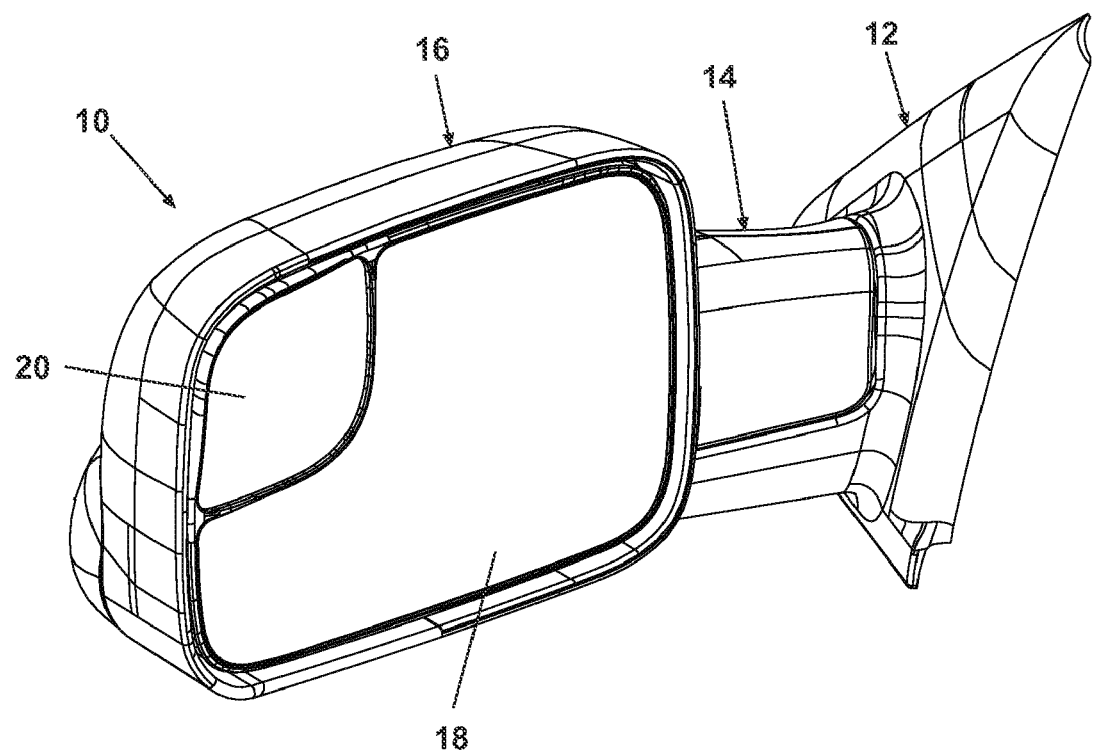
FIG. 1 is a first perspective view of a vehicular pivot mirror assembly according to the invention in a first, inboard position.
Figure 2:
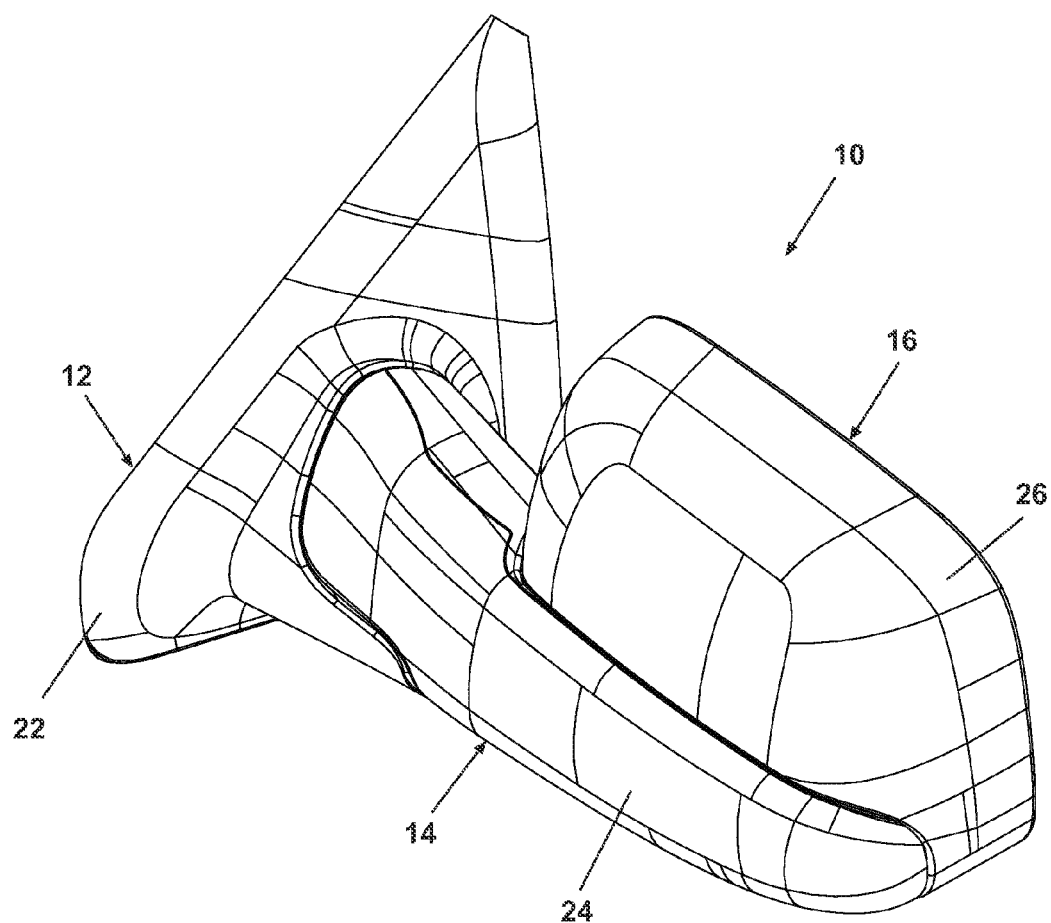
FIG. 2 is a second perspective view of the vehicular pivot mirror assembly illustrated in FIG. 1.

Referring now to the Figures, and in particular to FIGS. 1 and 2, a first embodiment of an external vehicular pivot mirror assembly 10 according to the invention is illustrated comprising a somewhat triangular-shaped base 12, and an elongated, somewhat irregularly shaped support arm 14, and a generally polyhedral reflective element assembly 16. The base 12 is adapted for attachment to a motor vehicle in a well-known manner. The reflective element assembly 16 encloses a primary reflective element 18, and may also enclose a secondary reflective element 20 such as a convex blind zone mirror. The base 12 comprises a base cover 22 enclosing a base frame (not shown). The support arm 14 comprises a support arm cover 24, and the reflective element assembly 16 comprises a reflective element assembly cover 26.

The vehicular pivot mirror assembly 10 can also be provided with enhanced functionality, such as an automatic dimming reflective element, a reflective element defogging/defrosting element, turn indicators, area lights, powered extension, power folding, and the like.

Figure 3:
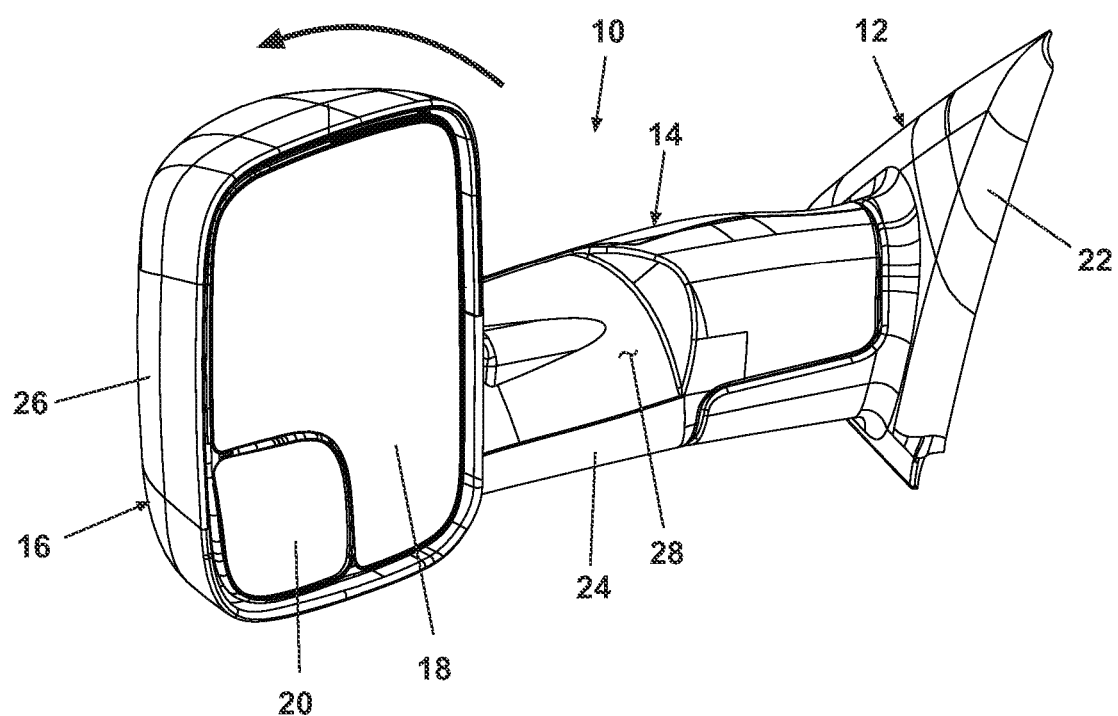
FIG. 3 is a first perspective view of the vehicular pivot mirror assembly illustrated in FIG. 1 in a second, outboard position.
Figure 4:
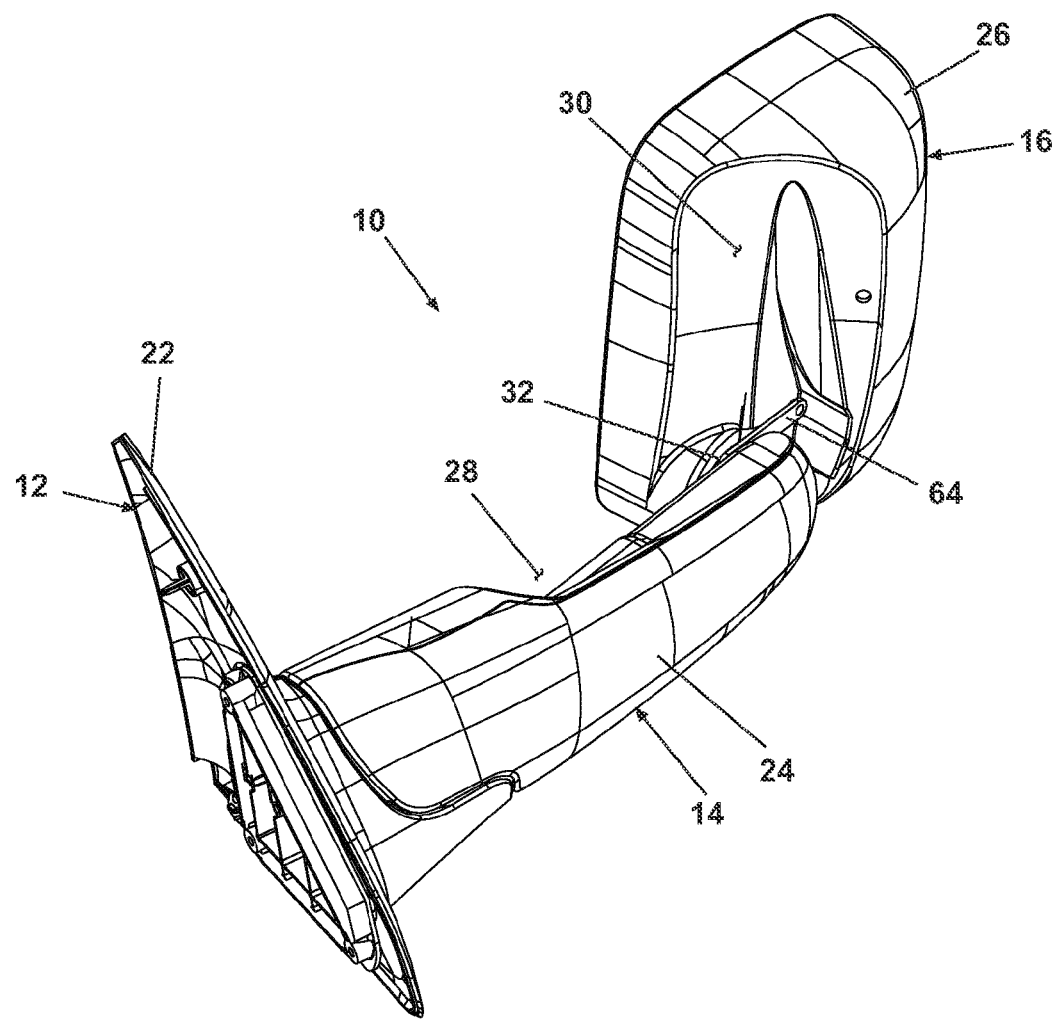
FIG. 4 is a second perspective view of the vehicular pivot mirror assembly illustrated in FIG. 3.

The pivot mirror assembly 10 can be pivoted between a first, inboard position shown in FIGS. 1 and 2, and a second, outboard position shown in FIGS. 3 and 4.

Figure 5:
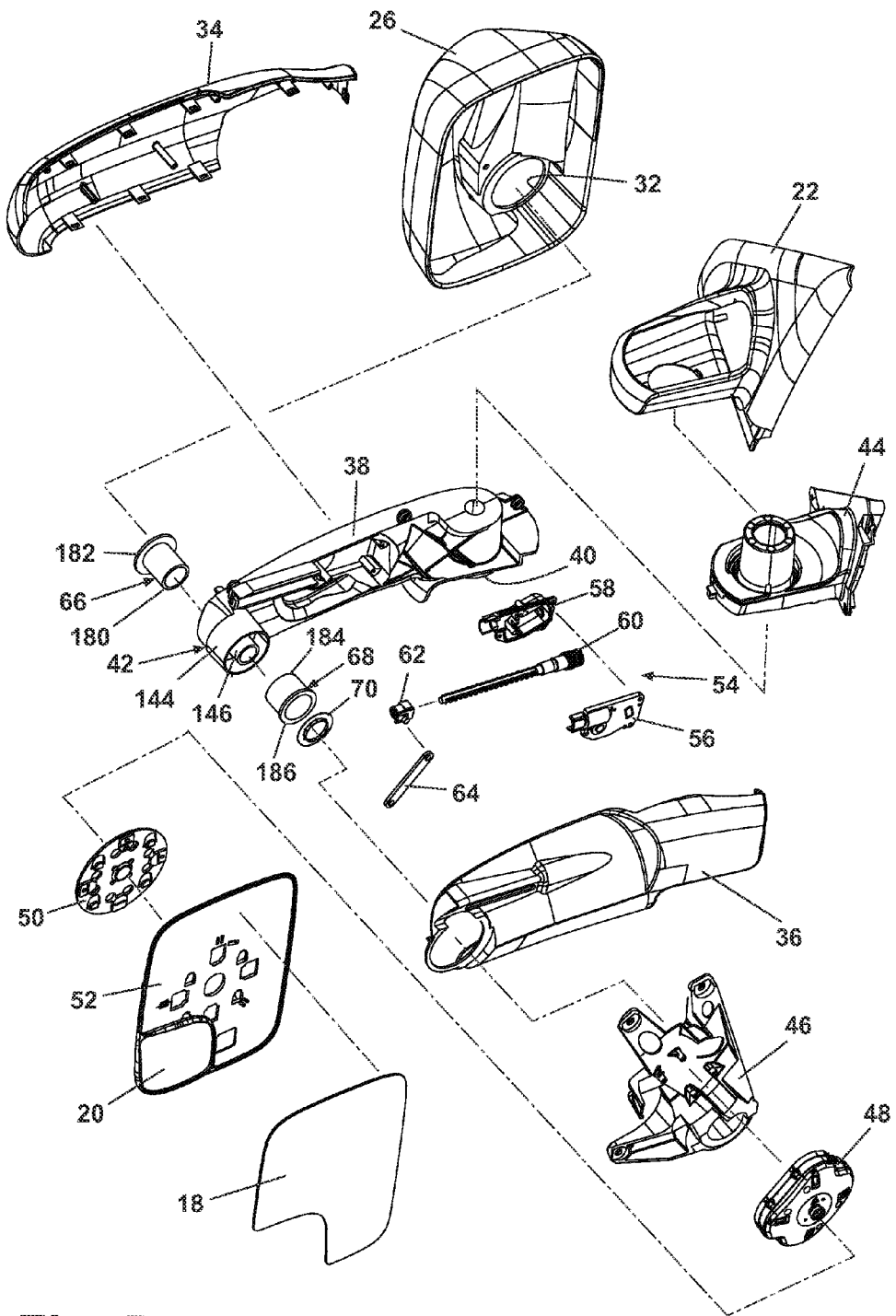
FIG. 5 is an exploded view of the vehicular pivot mirror assembly illustrated in FIG. 1 showing a first embodiment thereof.

Referring now to FIG. 5, the support arm 14 comprises a support arm frame 38, which is enclosed within the support arm cover 24 comprising a front support arm shell 34 and a rear support arm shell 36. The base 12 comprises a base frame 44 enclosed within the base cover 22. The reflective element assembly 16 comprises the reflective elements 18, 20 supported by a generally conventional glass case 52, attached to a tilt actuator plate 50 and a tilt actuator assembly 48 for adjusting the tilt of the reflective elements 18, 20 in a well-known manner. The tilt actuator assembly 48 is attached to a pivot frame 46 which is, in turn, attached to the reflective element assembly cover 26. A positioning assembly as hereinafter described comprises a pivot actuator assembly 54 mounted to the support arm frame 38 and attached to the pivot frame 46 for pivotal movement of the reflective element assembly 16 relative to the support arm 14.

Figure 6A:
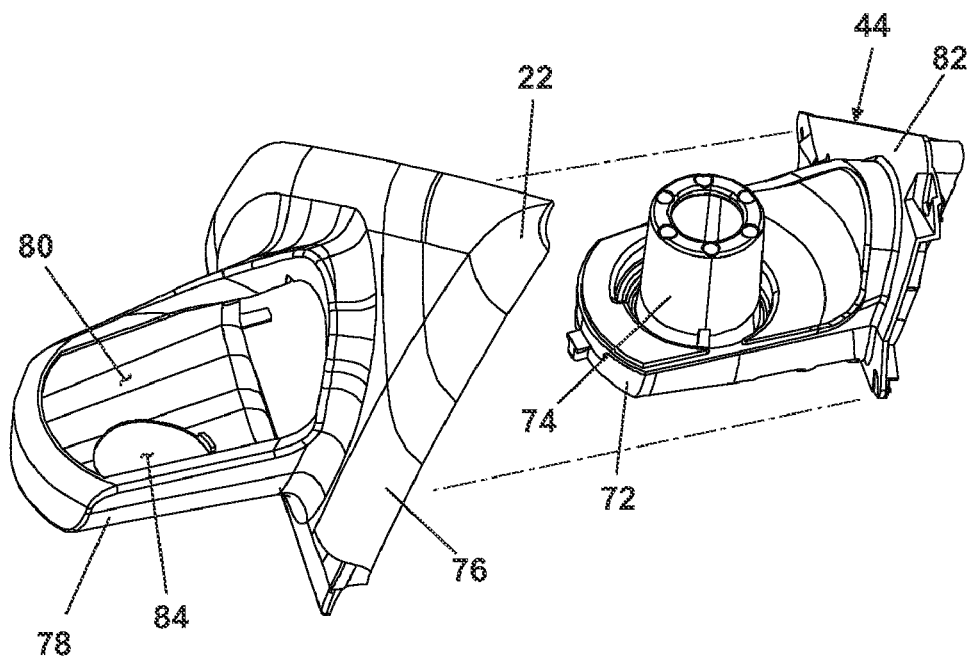
FIGS. 6A-B are exploded views of a base assembly comprising a portion of the vehicular pivot mirror assembly illustrated in FIG. 5.
Figure 6B:
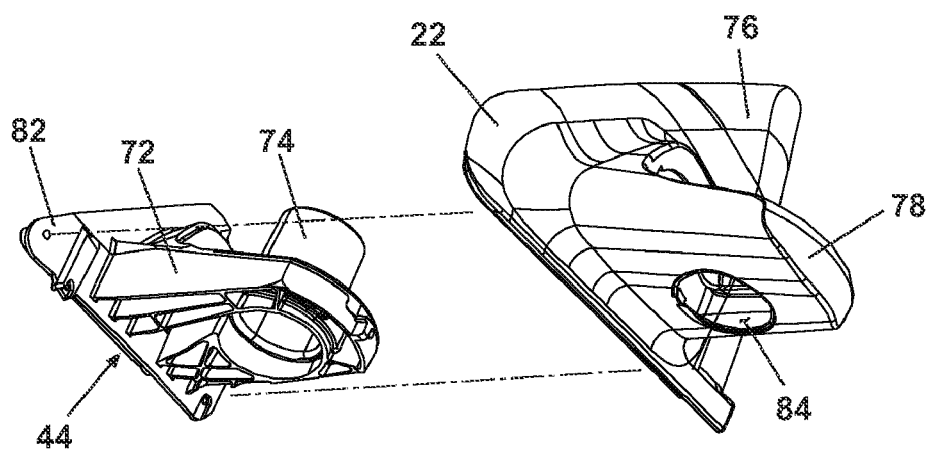

FIGS. 6A-B illustrated the base frame 44 and the base cover 22. The base frame 44 is an irregularly-shaped body having a generally well-known configuration comprising a base plate 82, from which a cantilever arm 72 extends laterally to terminate in a mirror fold pedestal assembly 74. The base plate 82 is adapted for attachment to a side portion of the vehicle in a generally well-known manner, and is shown having a generally triangular shape for purposes of illustration. The mirror fold pedestal assembly 74 is adapted for pivotal attachment of the support arm 14 in a generally well-known manner, which can comprise either a manual or power fold functionality.

The base cover 22 is adapted to fit over the base frame 44 in conformity therewith, and comprises a base plate shell 76, a cantilever arm shell 78 defining therein a cantilever arm cavity 80, and having an access opening 84 therethrough for facilitating the attachment of the support arm 14 to the mirror fold pedestal assembly 74.

Figure 7A:
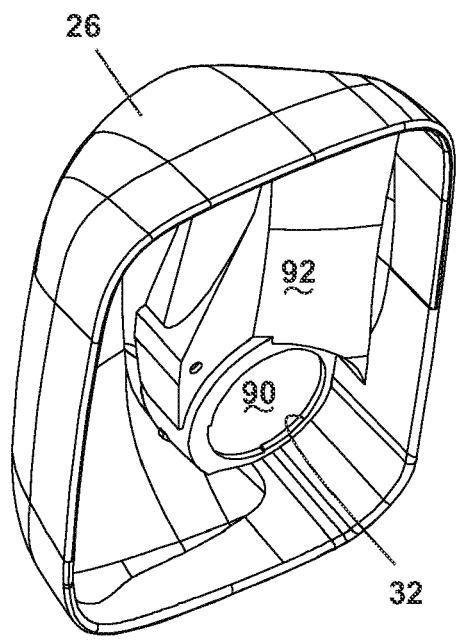
FIGS. 7A-B are perspective views of a reflective element assembly cover comprising a portion of the vehicular pivot mirror assembly illustrated in FIG. 5.
Figure 7B:
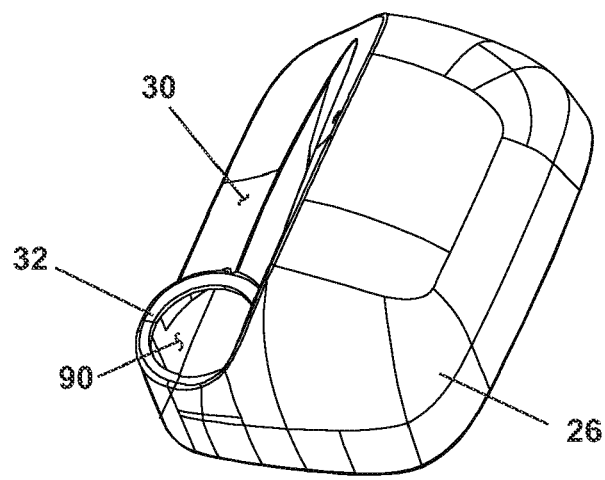

As shown in FIGS. 7A-B, the reflective element assembly cover 26 is a somewhat polyhedral-shaped, shell-like member defining a reflective element assembly cavity 92 therein. The reflective element assembly cover 26 is adapted to enclose the reflective elements 18, 20, the glass case 52, the tilt actuator plate 50, the tilt actuator assembly 48, and the pivot frame 46. An elongated recess 30 is formed in the reflective element assembly cover 26 and adapted for complementary register with the support arm 14. The recess 30 terminates at one end in a circular pivot housing 32 defining a pivot opening 90 therethrough.

Figure 8:
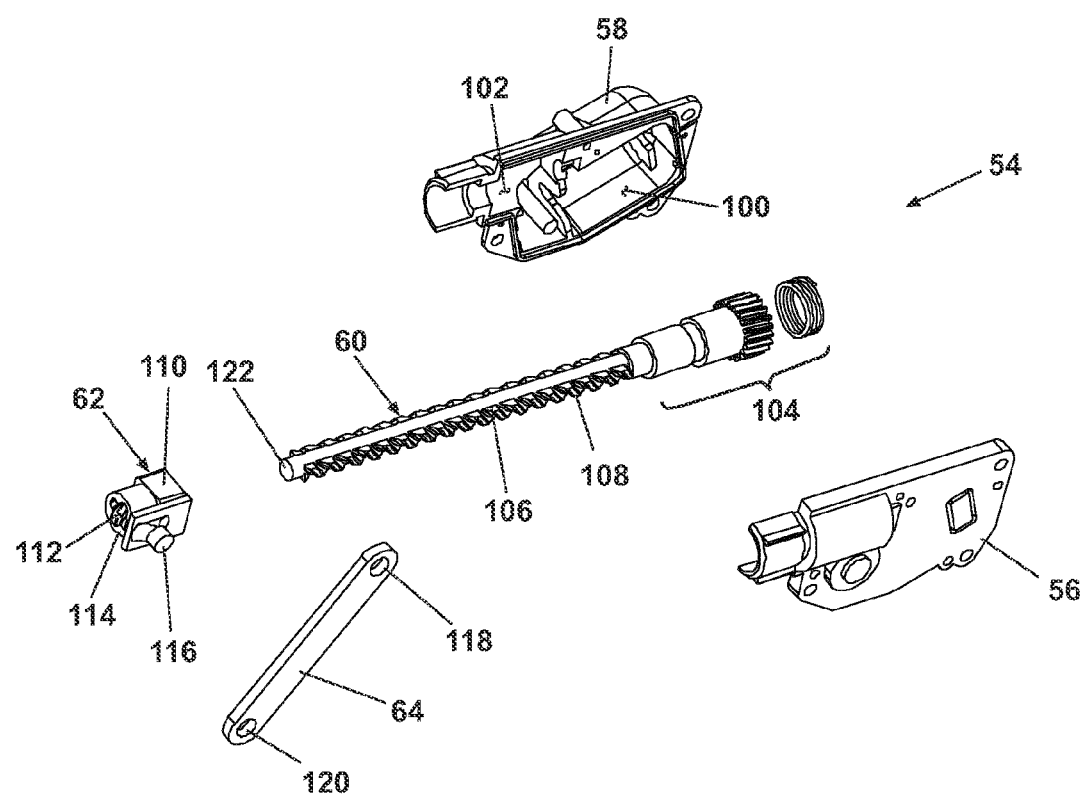
FIG. 8 is an exploded view of a pivot actuator assembly comprising a portion of the vehicular pivot mirror assembly illustrated in FIG. 5.

As illustrated in FIG. 8, the pivot actuator assembly 54 comprises motor/gear housing 55 comprising a pair of cooperatively engaging pivot actuator shells 56, 58 having a motor cavity 100 and a transmission cavity 102 for enclosing a motor and a transmission (neither shown), respectively. An actuator shaft 60 comprises a gear/clutch portion 104 at a first end adapted for operable communication with the transmission for rotation of the actuator shaft 60 with operation of the motor, and a threaded portion 106 extending away from the gear/clutch portion 104 toward a second end terminating in a cylindrical stub shaft 122. The threaded portion 106 is provided with helical threads 108.

An actuator nut 62 is a somewhat prismatic-shaped body comprising a nut housing 110 having a shaft orifice 112 extending longitudinally therethrough provided with threads 114 adapted for threadable engagement with the threaded portion 106 of the actuator shaft 60. Extending radially outwardly from the nut housing 110 is a cylindrical link post 116. As the actuator shaft 60 rotates, the actuator nut 62 will be translated linearly along the actuator shaft 60 in a longitudinal direction dependent upon the direction of rotation of the actuator shaft 60. The structure and operation of the pivot actuator assembly 54 are as generally described further in U.S. Provisional Patent Application Ser. No. 60/521,090, filed Feb. 19, 2004, entitled "Twin-Arm Vehicle Mirror with Powerextend Actuator" and U.S. Provisional Patent Application Ser. No. 60/320,292, filed Jun. 19, 2003, entitled "Vehicle Mirror with Powered Extension Incorporating Slip Clutch", which are hereby incorporated by reference as though set forth fully herein.

Preferably, the pitch of the thread 108 and the threads 114 are adapted so that, if sufficient force is applied to the actuator nut 62 longitudinally along the actuator shaft, the actuator shaft 60 will be urged to rotate.

A pivot link 64 is an elongated, generally strap-like member comprising a circular nut orifice 118 extending therethrough at a first end, and a circular pivot frame orifice 120 extending therethrough at a second end. The nut orifice 118 is adapted for slidable communication with the link post 116.

Figure 9A:
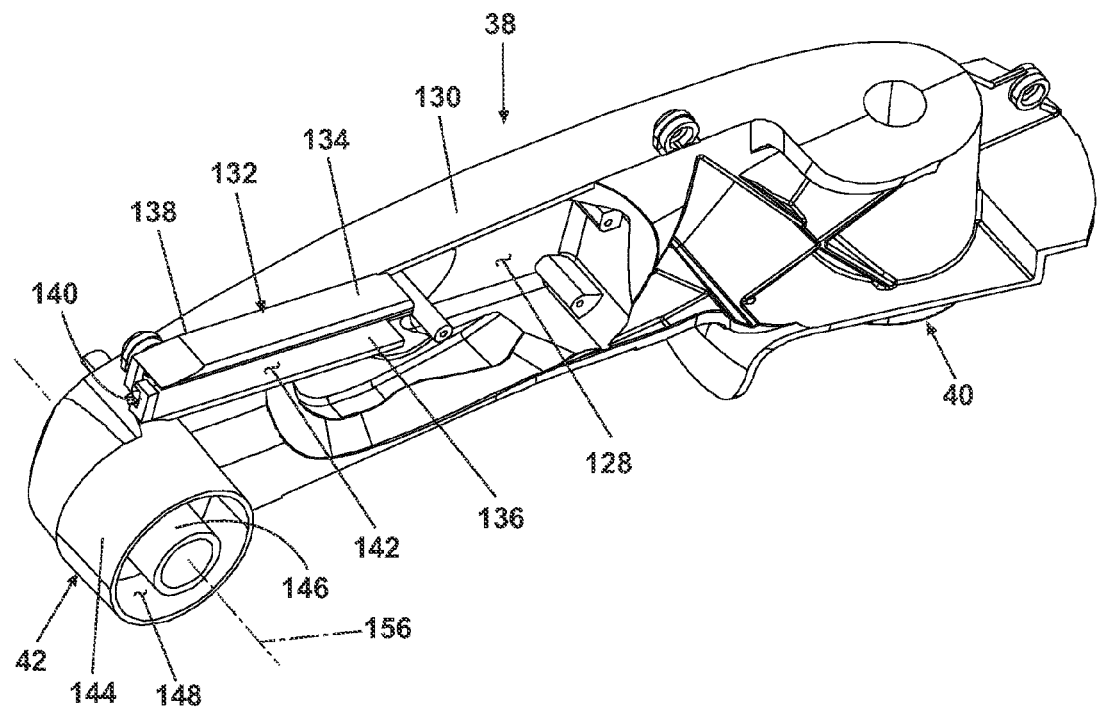
FIGS. 9A-B are perspective views of a support arm frame comprising a portion of the vehicular pivot mirror assembly illustrated in FIG. 5.
Figure 9B:
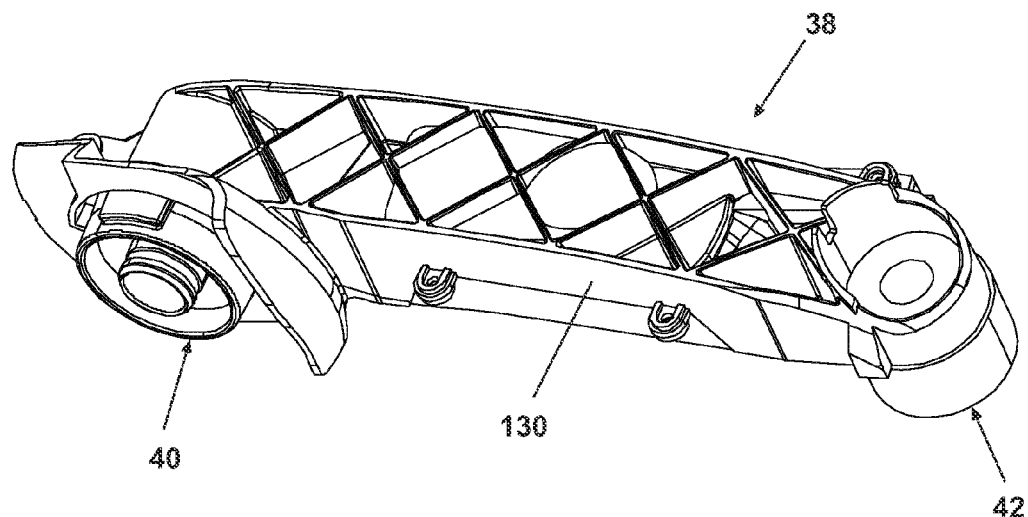

The support arm frame 38 is illustrated in FIGS. 9A-B. The support arm frame 38 is an elongated, irregularly-shaped member comprising a mirror fold bearing sleeve 40 at a first end and a pivot bearing sleeve 42 at an opposed, second end. The mirror fold bearing sleeve 40 is adapted for rotational communication with the mirror fold pedestal assembly 74 for selective movement of the support arm 14 alternately against and away from the motor vehicle. A bridge portion 130 extends between the mirror fold bearing sleeve 40 and the pivot bearing sleeve 42. An elongated, rectilinear nut housing 132 extends from the bridge portion 130 to the pivot bearing sleeve 42, and comprises a top wall 134 and a bottom wall 136 in parallel juxtaposition, joined by a side wall 138, to define a nut channel 142. The nut housing 132 terminates in a shaft end bearing 140 adjacent the pivot bearing sleeve 42 adapted for slidable receipt of the stub shaft 122 therein. The nut housing 132 is adapted for slidable receipt of the actuator nut 62 therein, with the link post 116 extending away from the sidewall 138.

The approximate midpoint of the bridge portion 130 is provided with an actuator chamber 128 adapted to fixedly enclose the pivot actuator assembly 54 so that the actuator shaft 60 with the actuator nut 62 threaded thereon extends through the nut channel 142 with the stub shaft 122 journaled into the shaft end bearing 140.

The pivot bearing sleeve 42 comprises an annular outer wall 144 and an annular inner wall 146 separated by an annulus 148. The outer wall 144, the inner wall 146, and the annulus 148 are coaxial about an axis 156 which is generally parallel to the support surface for the motor vehicle when the mirror assembly 10 is operably attached to the motor vehicle.

Figure 10A:
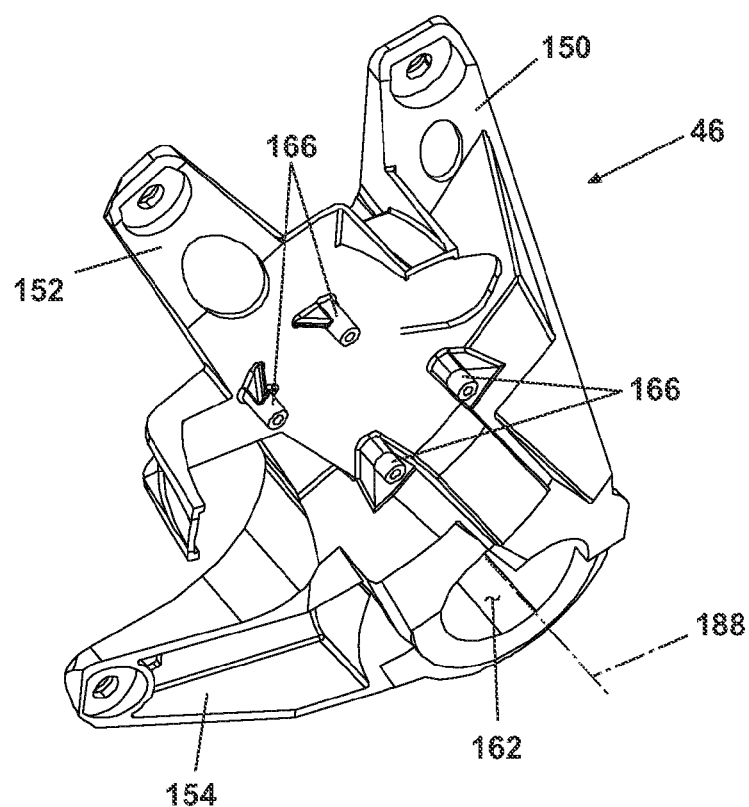
FIGS. 10A-B are perspective views of a pivot frame comprising a portion of the vehicular pivot mirror assembly illustrated in FIG. 5.
Figure 10B:
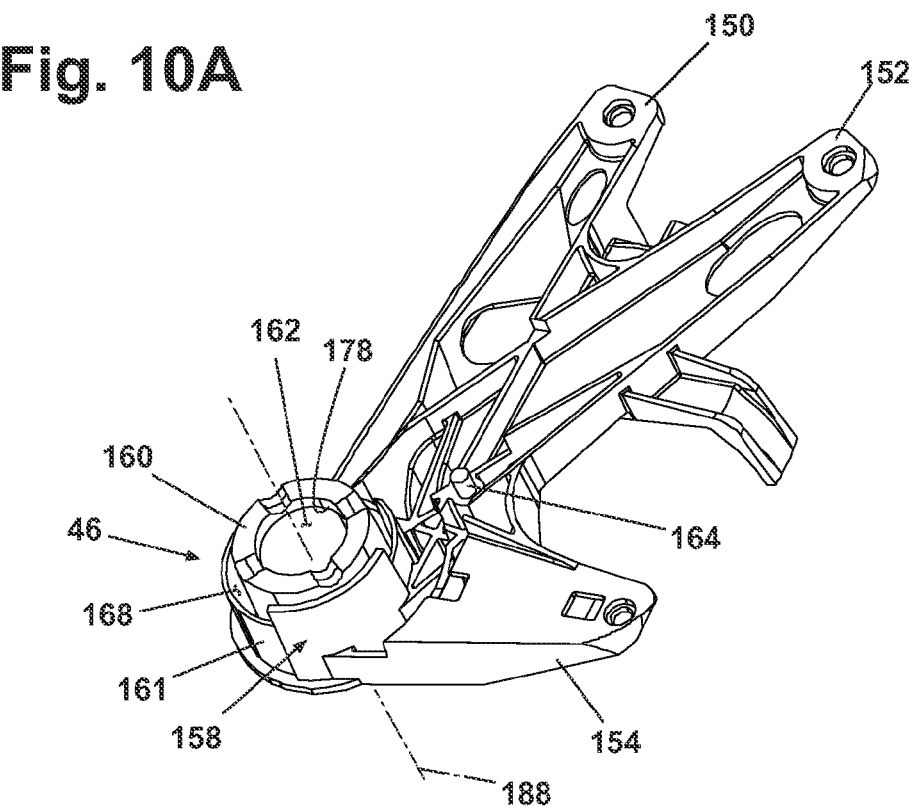

FIGS. 10A-B illustrate the pivot frame 46. The pivot frame 46 is a generally irregularly-shaped body comprising a plurality of mounting arms 150, 152, 154, shown for illustrative purposes as numbering three, extending somewhat radially away from a somewhat cup-like pivot bearing 158. The pivot bearing 158 comprises an inner annular wall 160 and an outer annular wall 161 separated by an annulus 168. The pivot bearing 158 is provided with a circular opening 178 coaxial with the inner annular wall 160 and fluidly communicating with a generally cylindrical chamber 162 defined by the inner annular wall 160. The inner annular wall 160, the outer annular wall 161, the annulus 168, the opening 178, and the chamber 162, are coaxial with an axis 188 extending generally perpendicular to the mounting arms 150, 152, 154. The mounting arms 150, 152, 154 are adapted for attachment to the reflective element assembly cover 26 through suitable fasteners, such as threaded fasteners or rivets, extending through apertures in the ends of the mounting arms 150, 152, 154. The pivot frame 46 is also provided with a plurality of tilt actuator mounting posts 166 for attaching the tilt actuator assembly 48 to the pivot frame 46.

Figure 11:
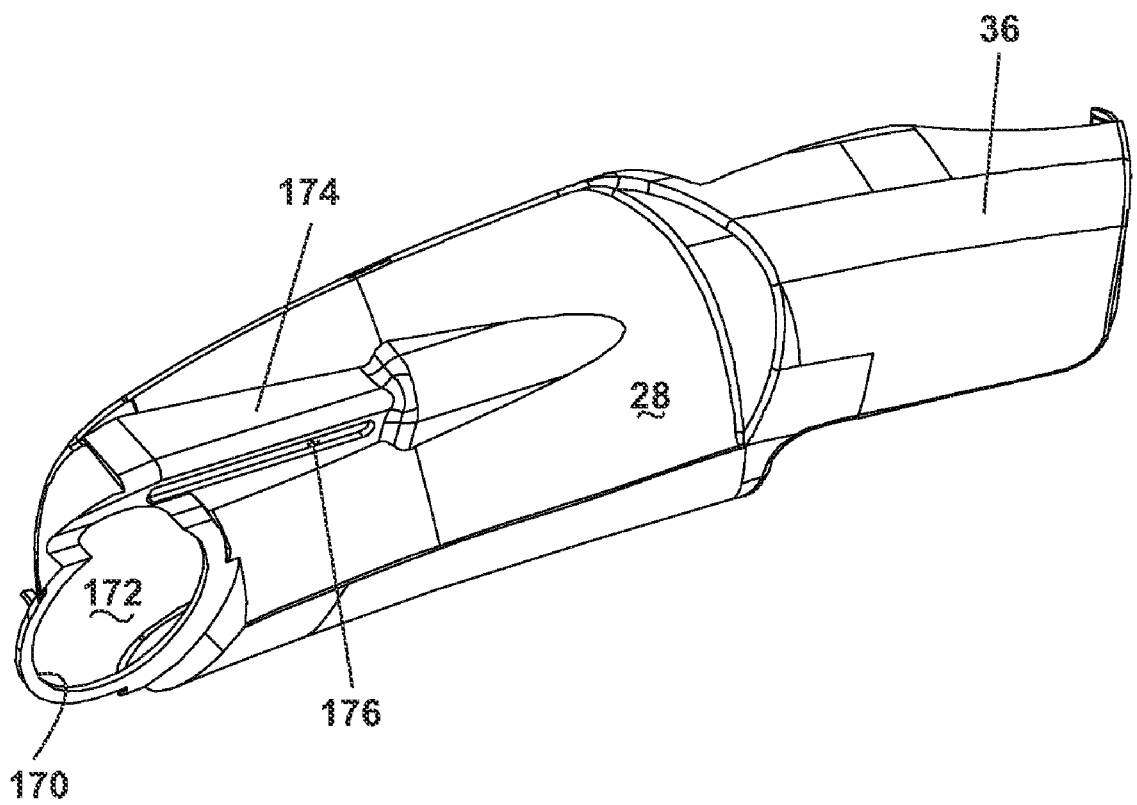
FIG. 11 is a perspective view of a portion of a support arm shell comprising a portion of the vehicular pivot mirror assembly illustrated in FIG. 5.

Referring now to FIG. 11, the rear support arm shell 36 is an elongated member adapted for partial enclosure of the support arm frame 38. The rear support arm shell 36 terminates in a pivot ring 170 at a first end thereof defining a pivot opening 172 adapted for cooperative register with the pivot opening 90 of the reflective element assembly cover 26 to enable slidable relative rotation of the pivot ring 170 with the pivot housing 32. Extending tangentially away from the pivot ring 170 is an elongated pivot actuator housing 174 having a slot 176 extending longitudinally therealong. The pivot actuator housing 174 is adapted for cooperative register with the nut housing 132 so that the link post 116 can extend through the slot 176 and translate along the slot 176 as the actuator nut 62 translates along the nut channel 142.

The rear support arm shell 36 is also adapted with an elongated recess 28 adapted for cooperative register with the recess 30 in the reflective element assembly cover 26 when the reflective element assembly cover 26 is rotated toward the support arm 14.

Referring again to FIG. 5, an annular inner bearing sleeve 66 is illustrated comprising an annular bearing sleeve wall 180 transitioning at one end to an annular bearing sleeve flange 182 extending circumferentially outwardly from the sleeve wall 180. An annular outer bearing sleeve 68 is illustrated comprising an annular bearing sleeve wall 184 transitioning at one end to an annular bearing sleeve flange 186 extending circumferentially outwardly from the sleeve wall 184. The bearing sleeves 66, 68 are preferably fabricated of an extremely low friction material enabling relatively unimpeded relative rotation of the sleeves 66, 68.

Figure 14:
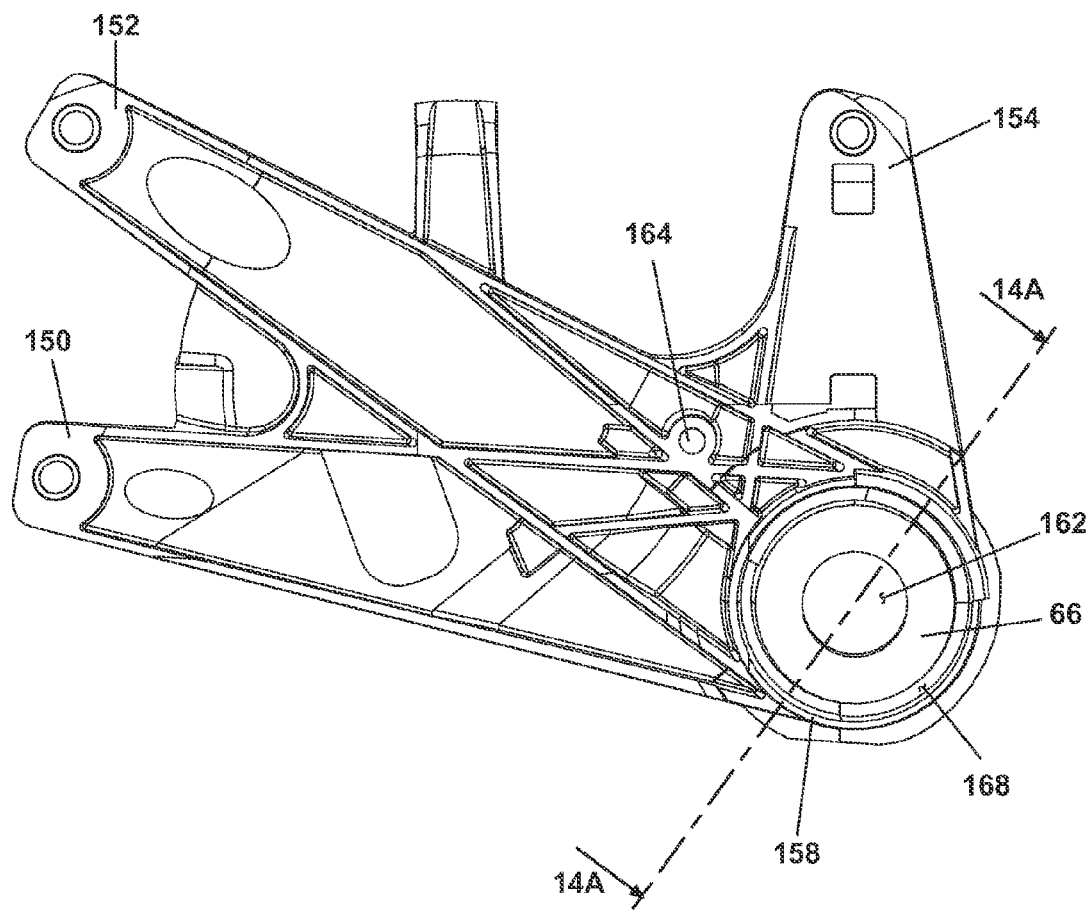
FIG. 14 is a front elevation view of the pivot frame illustrated in FIGS. 10A-B illustrating the assembly of pivot bearing components comprising a portion of the vehicular pivot mirror assembly.
Figure 14A:
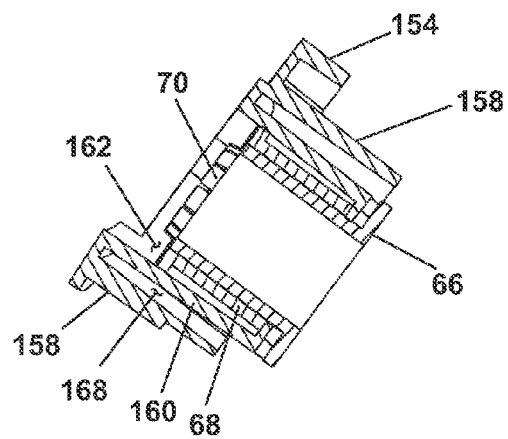
FIG. 14A is a sectional view taken along view line 14A-14A of FIG. 14.
Figures 15, 15A:
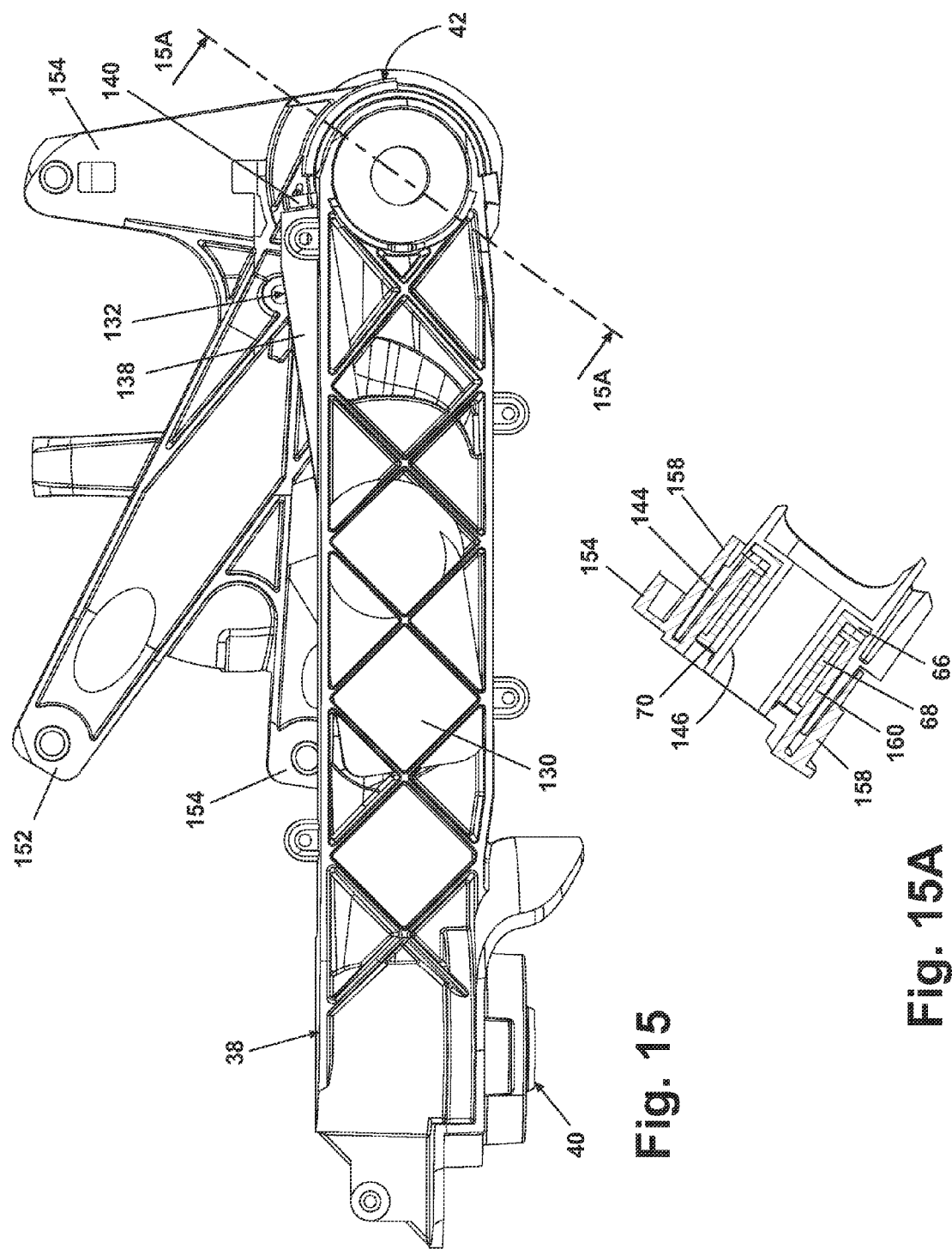
FIG. 15 is a front elevation view of the pivot frame illustrated in FIGS. 10A-B connected to the support arm frame illustrated in FIGS. 9A-B.
FIG. 15A is a sectional view taken along view line 15A-15A of FIG. 15.

Referring now to FIGS. 14 and 15, the nested relationship of the bearing sleeves 66, 68 with the pivot frame 46 and the support arm frame 38 is illustrated. The outer bearing sleeve 68 is inserted into the chamber 162 in the pivot frame 46 so that the bearing sleeve flange 186 extends away from the opening 178. As shown in FIG. 14A, the chamber 162 is adapted for slidable communication with the bearing sleeve flange 186. The inner bearing sleeve 66 is inserted through the opening 178 so that the bearing sleeve wall 180 of the inner bearing sleeve 66 is in slidable communication with the bearing sleeve wall 184 of the outer bearing sleeve 68. The bearing sleeve flange 182 will be in communication with the inner annular wall 160. Referring also to FIG. 15A, the pivot bearing sleeve 42 of the support arm frame 38 is brought into operable communication with the pivot bearing 158 of the pivot frame 46 so that the inner wall 146 is in slidable communication with the bearing sleeve wall 180, the outer wall 144 is received within the annulus 168, and the inner annular wall 160 is received within the annulus 148. A retainer, such as a press-fit ring or push nut 70, is installed over the inner wall 146 and is adapted to bear against the bearing sleeve flange 186 and the inner bearing sleeve wall 180 to pivotably secure the pivot frame 46 to the support arm frame 38.

Figure 12:
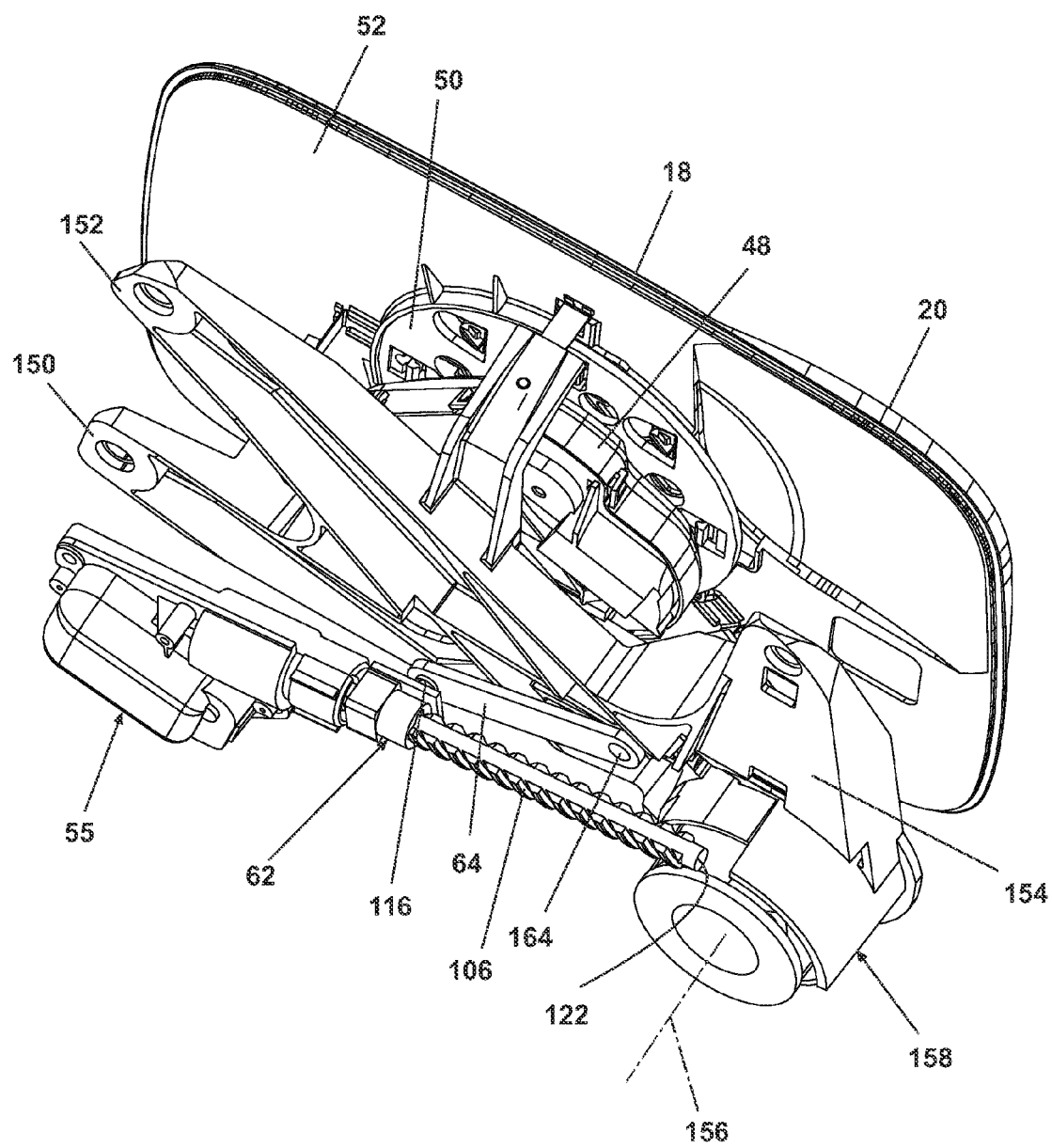
FIG. 12 is a perspective view of the assembled vehicular pivot mirror assembly illustrated in FIG. 5 with parts removed for clarity.

FIG. 12 illustrates the pivot actuator assembly 54 and the pivot frame 46 in relative assembled position, with portions of the pivot rear assembly 10, including the support arm frame 38 removed for clarity. As illustrated in FIG. 12, the pivot link 64 interconnects the actuator nut 62 and the pivot frame 46 when the link post 116 is inserted into the nut orifice 118 and the link pin 164 is inserted into the pivot frame orifice 120. As the actuator nut 62 travels longitudinally along the threaded portion 106 of the actuator shaft 60, the pivot link 64 will be translated to the right (as viewed in FIGS. 12 and 13), thereby urging the pivot frame 46 into rotation about an axis 156 passing coaxially through the pivot bearing 158.

Figure 13:
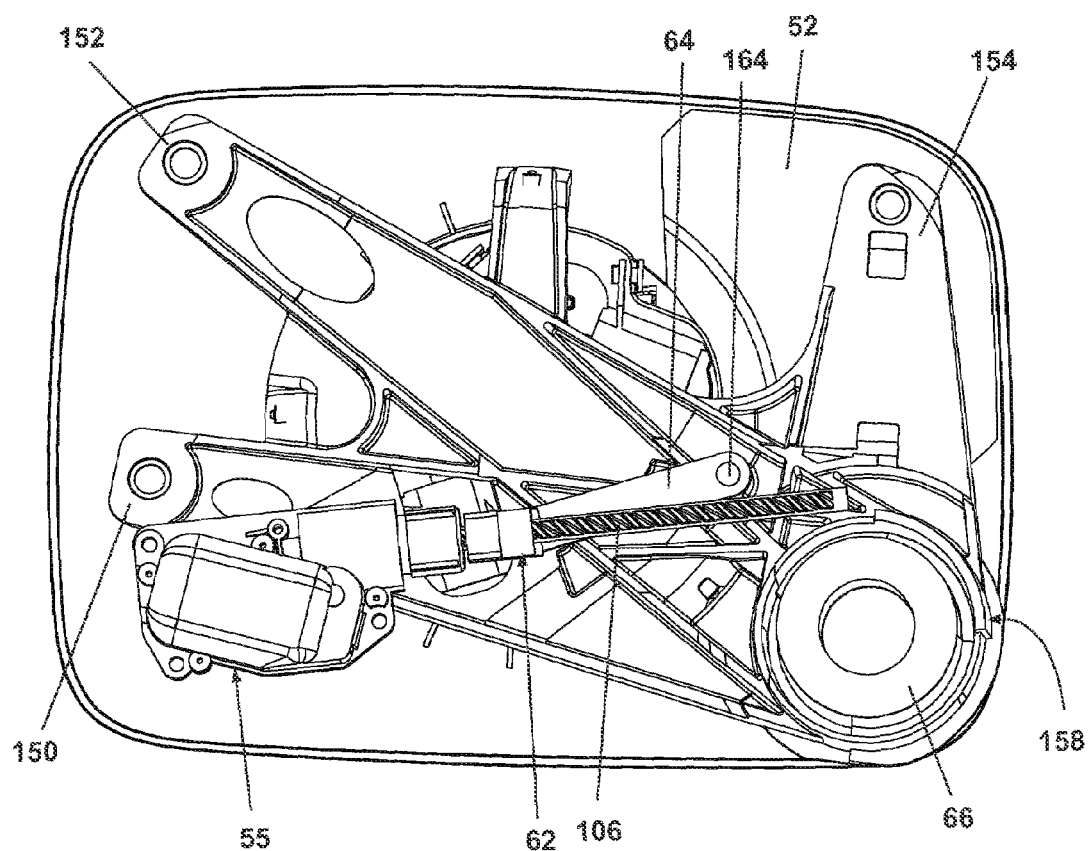
FIG. 13 is a front elevation view of the assembled vehicular pivot mirror assembly illustrated in FIG. 12 in a first, inboard position.
Figure 16:
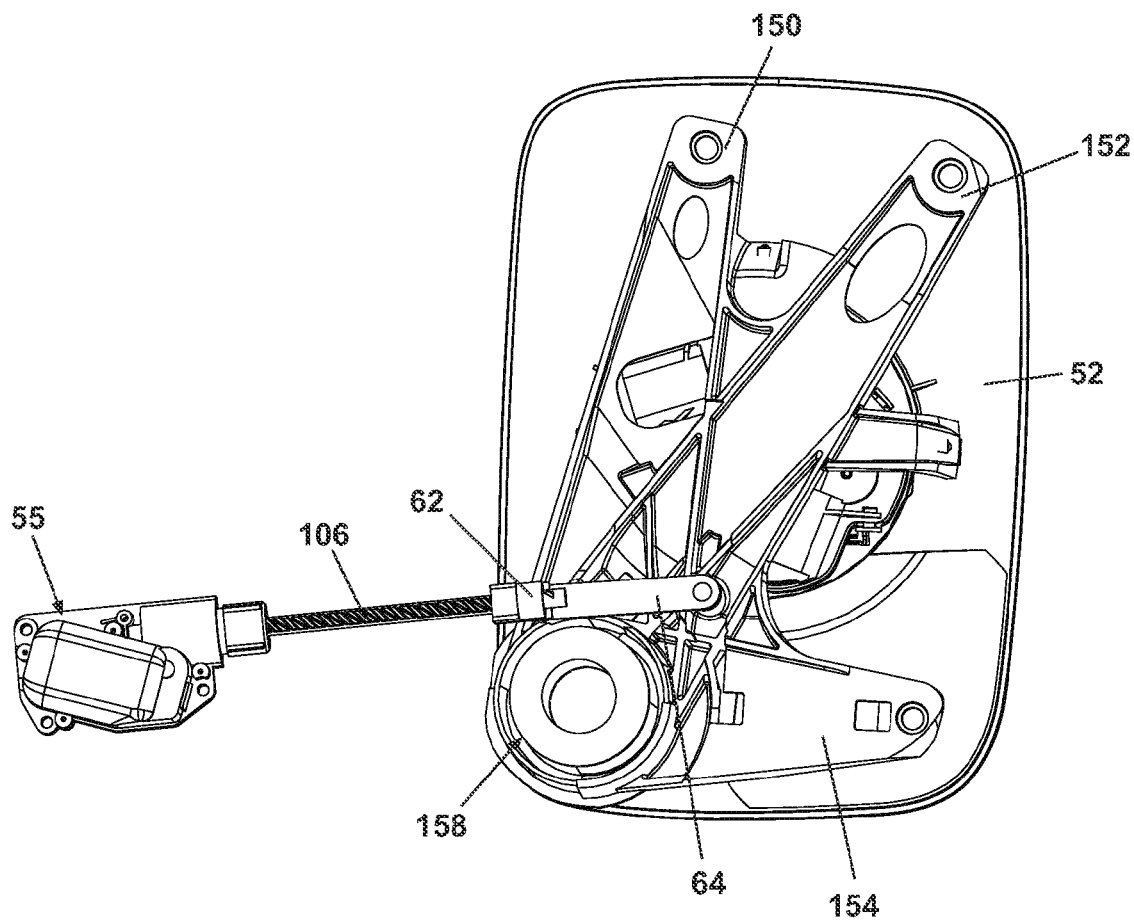
FIG. 16 is a front elevation view of the assembled vehicular pivot mirror assembly illustrated in FIG. 12 in a second, outboard position.

As illustrated in FIGS. 12 and 13, with the actuator nut 62 adjacent the pivot actuator shell 56, 58, the reflective element assembly 16 will be in an inboard position, as illustrated in FIGS. 1 and 2. As illustrated in FIG. 16, with the actuator nut 62 adjacent the stub shaft 122, the reflective element assembly 16 will be in an outboard position, as illustrated in FIGS. 3 and 4.

The first embodiment of the vehicular pivot mirror assembly 10 has been illustrated and described as incorporating a power-driven pivot actuator assembly 54 comprising an electric motor and a transmission which operates, through the pivot link 64, to rotate the reflective element assembly 16 between an inboard position and an outboard position. The pivot actuator assembly 54 described herein enables the reflective element assembly 16 to be manually pivoted between the inboard and outboard positions due to the configuration of the threads 108, 114 and the clutch assembly. All other elements of the pivot mirror assembly 10 remain the same.

Figure 19:
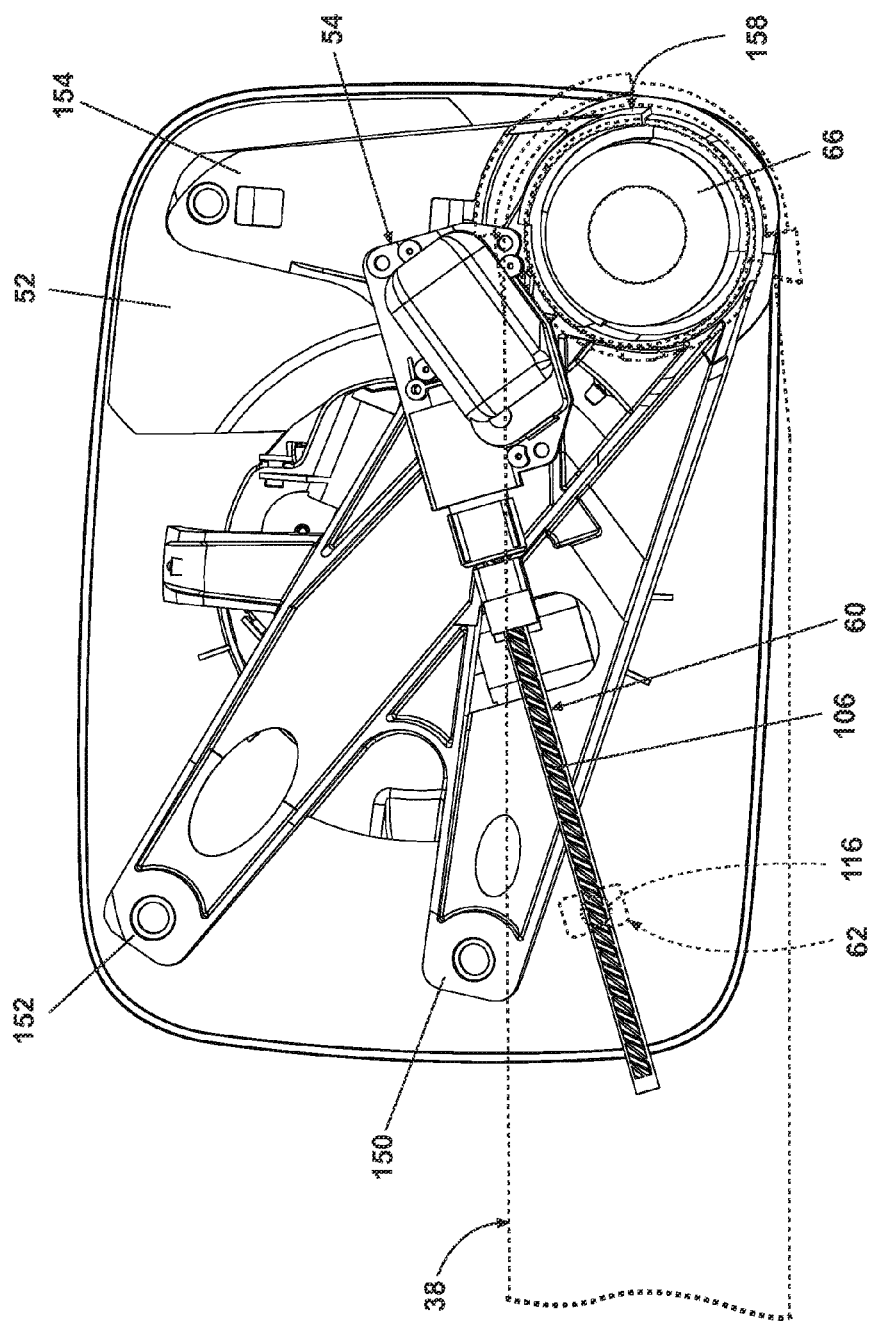
FIG. 19 is a front elevation view of an alternate configuration of the assembled vehicular pivot mirror assembly illustrated in FIGS. 5-16, with the support arm frame shown in phantom for clarity.
Figure 20:
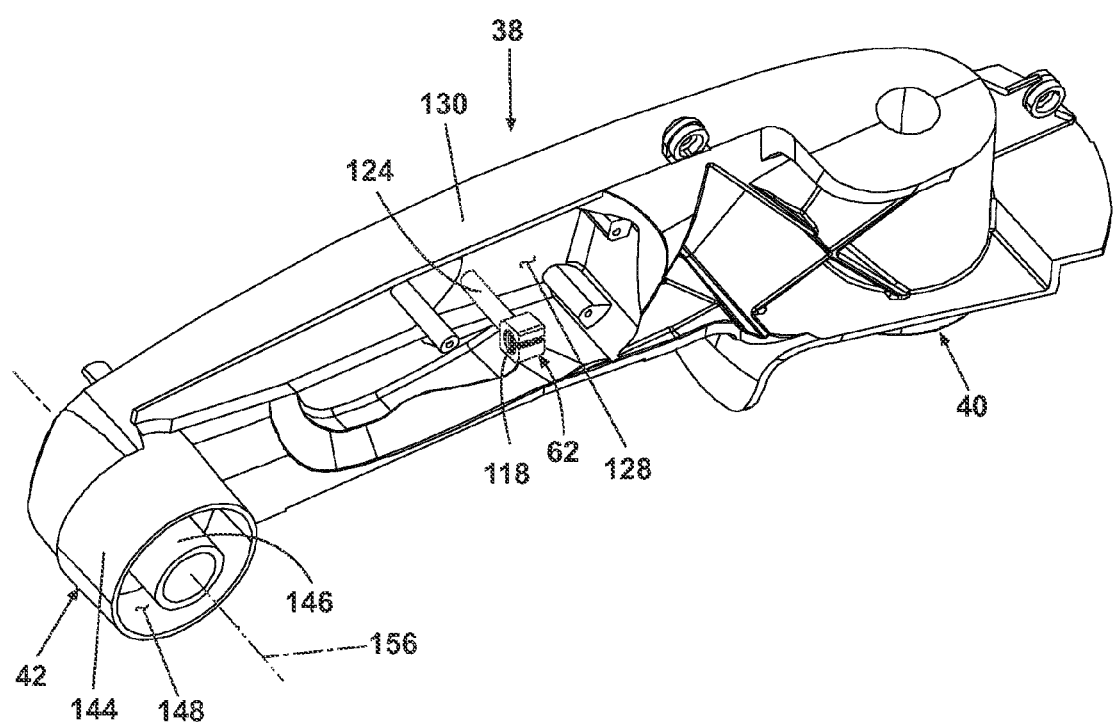
FIG. 20 is a perspective view of the support arm frame comprising a portion of the alternate configuration illustrated in FIG. 19.

Referring to FIGS. 19 and 20, an alternate configuration of the first embodiment illustrated in FIGS. 5-16 comprises a switching of the relative positions of the actuator shaft 60 and the actuator nut 62. Thus, the actuator assembly 54 and the actuator shaft 60 are illustrated as attached to the mounting arm 152 of the pivot frame 46, and the actuator nut 62 is illustrated as attached to the support arm frame 38. Operation of the actuator assembly 54 will urge the translation of the actuator shaft 60 and the pivoting of the pivot frame 46 relative to the stationary actuator nut 62. To facilitate unrestricted relative movement of the actuator shaft 60 and the actuator nut 62, the actuator assembly 54 can be pivotally attached to the pivot frame 46 for pivoting about an axis extending generally parallel to the pivot axes 156, 188. Similarly, the actuator nut 62 can be pivotally attached to the support arm frame 38 through the link post 116 for pivoting about an axis also extending generally parallel to the pivot axes 156, 188. As illustrated in FIG. 20, the link post 116 can be pivotally coupled with a nut post 124 extending laterally from the support arm frame 38 adapted to suitably position the actuator nut 62 relative to the actuator shaft 60.

Figure 17:
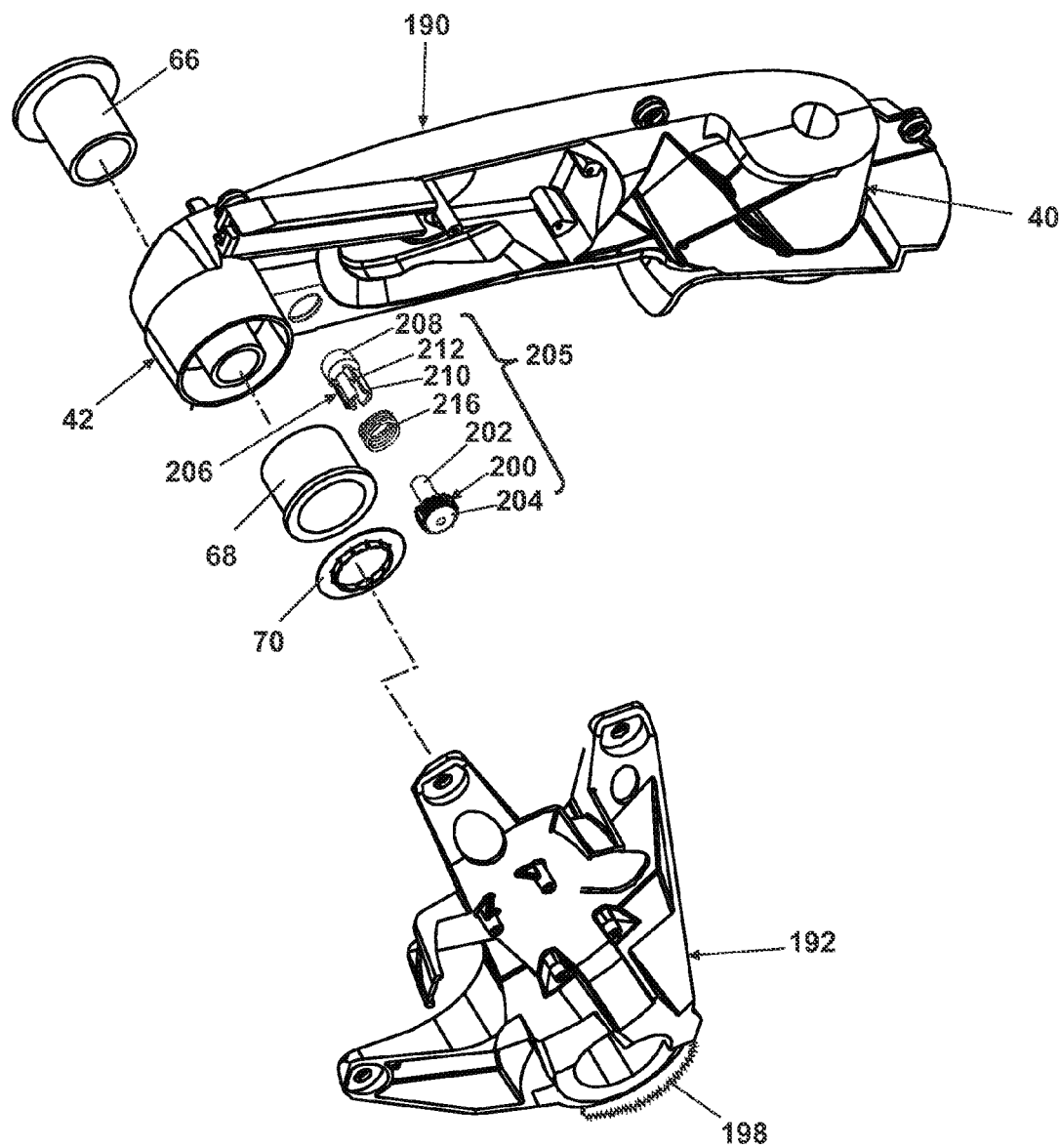
FIG. 17 is an exploded view of a portion of the vehicular pivot mirror assembly illustrated in FIG. 1 showing a second embodiment thereof.

FIG. 17 illustrates a second embodiment of the pivot mirror assembly for manual pivoting of the reflective element assembly 16 comprising an alternate positioning assembly. A support arm frame 190 is identical to the support arm frame 38 with the addition of a chamber 196 in the support arm frame 190 adjacent the pivot bearing sleeve 42. A circular opening 194 is provided into the chamber 196. A pivot frame 192 is identical to the pivot frame 46 with the addition of an arcuate toothed rack 198 extending partially along the outer circumference of the pivot bearing sleeve 42. The pivot actuator assembly 54 is omitted in this embodiment.

A clutch assembly 205 comprises a clutch cylinder 206 and a pinion 200. The pinion 200 is a somewhat T-shaped body having a smooth cylindrical shaft 202 transitioning coaxially at a first end to a circular toothed portion 204. The clutch cylinder 206 is a generally annular body having a shaft aperture 214 extending axially therethrough and adapted for slidable communication with the shaft 202. The clutch cylinder 206 comprises an annular base 208 and a plurality of coaxially-oriented elongated fingers 210 extending longitudinally therefrom, having an arcuate cross-section. The fingers 210 are separated by elongated slots 212 which enable the fingers 210 to freely deflect inwardly. A helical spring 216 is adapted to be retained circumferentially around the fingers 210 to impart an inward compressive force on the fingers 210. When the shaft 202 is received in the shaft aperture 214, the spring 216 will impart a force urging the fingers 210 into frictional communication with the shaft 202.

The magnitude of the force can be adjusted by adjusting the compressive force exerted by the spring 216. The pinion 200 will be prevented from moving relative to the clutch cylinder 206 as a result of the frictional force between the fingers 210 and the shaft 202. However, if sufficient rotational force is applied to the pinion 200 to overcome the frictional force between the fingers 210 and the shaft 202, the pinion 200 will rotate relative to the clutch cylinder 206.

The clutch assembly 205 is received within the chamber 196 with the clutch cylinder 206 fixedly retained in the chamber 196 to prevent rotation of the clutch cylinder 206 relative to the support arm frame 190. The pinion 200 extends from the clutch cylinder 206 through the opening 194 for toothed engagement with the rack 198. As so assembled, the pinion 200 will be held against rotation relative to the clutch cylinder 216, thereby maintaining the reflective element assembly 16 in a preselected position. With sufficient pivoting force applied to the reflective element assembly 16 to rotate the reflective element assembly 16 relative to the support arm frame 190, the frictional force between the clutch cylinder 206 and the pinion 200 will be overcome and the reflective element assembly 16 will be repositioned.

Figure 18:
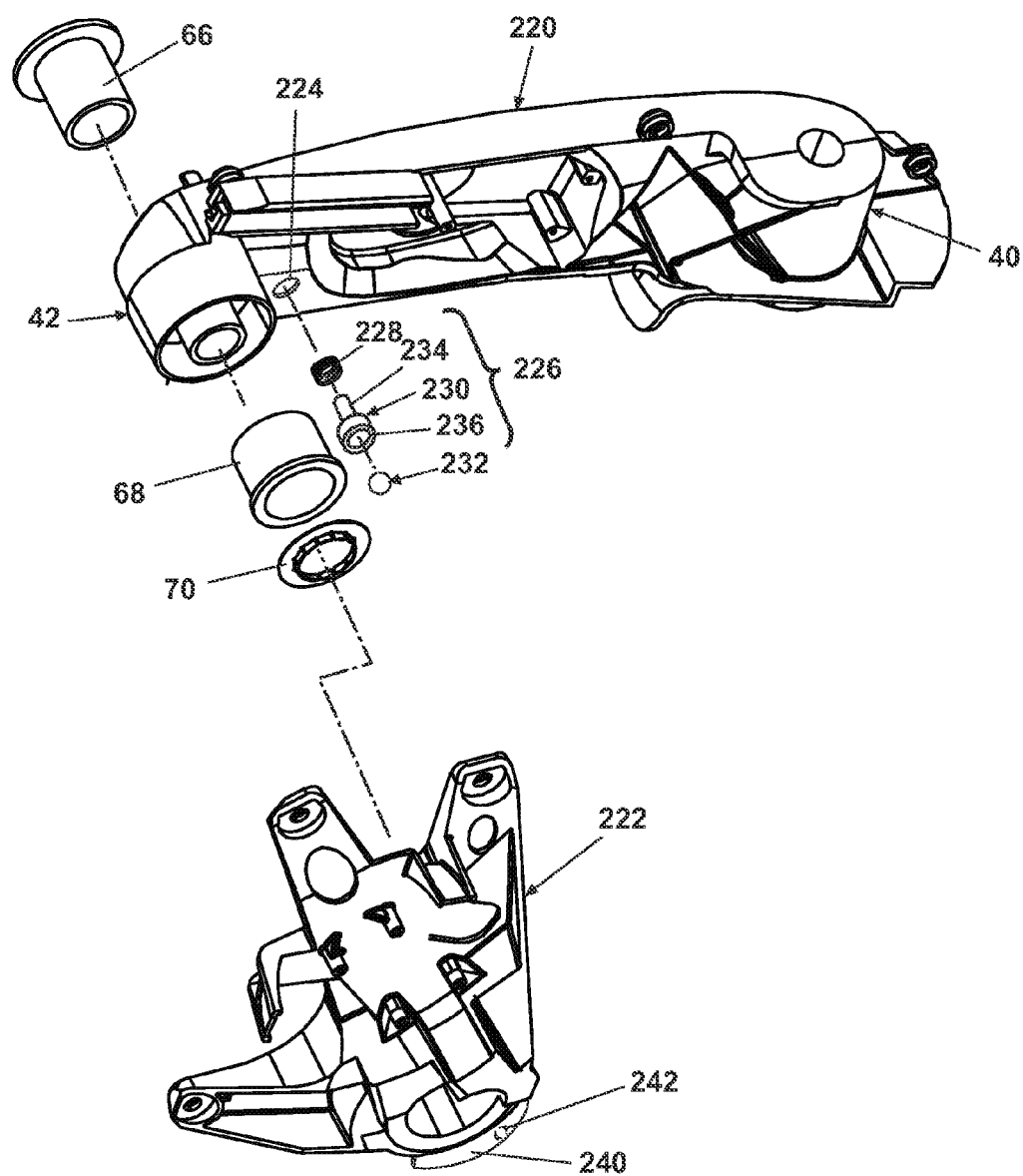
FIG. 18 is an exploded view of a portion of the vehicular pivot mirror assembly illustrated in FIG. 1 showing a third embodiment thereof.

FIG. 18 illustrates a third embodiment of the pivot mirror assembly for manual pivoting of the reflective element assembly 16 comprising yet another alternate positioning assembly. A support arm frame 220 is identical to the support arm frame 38 with the addition of a stop pin chamber 224 in the support arm frame 220 adjacent the pivot bearing sleeve 42. A pivot frame 222 is identical to the pivot frame 46 with the addition of an arcuate flange 240 extending partially along the outer circumference of the pivot bearing sleeve 42. The pivot actuator assembly 54 is omitted in this embodiment.

A stop pin assembly 226 is adapted for slidable insertion into the stop pin receptacle 224, and comprises a spring 228 and a stop pin 230. The stop pin 230 comprises a cylindrical shaft 232 transitioning coaxially at a first end to a circular housing 236 having a semi-spherical receptacle 238 in opposed coaxial juxtaposition with the shaft 232. The spring 228 is adapted for slidable receipt over the shaft 232 and communication with the housing 236. A sphere 232 is adapted for rotational seating in the receptacle 238 for rotation of the sphere 232 relative to the housing 236.

The arcuate flange 240 is provided with a stop 242 adapted for seating of the sphere 232 therein. A single stop 242 is illustrated in FIG. 18. However, a plurality of stops can be positioned along the arcuate flange 240 to correspond to desired rotated positions of the pivot frame 222. The stop pin assembly 226 is received in the stop pin chamber 224 with the spring 228 bearing against the housing 236 to urge the stop pin assembly 226 away from the stop pin chamber 224. As so assembled, the sphere 232 will be urged into contact with the arcuate flange 240, thereby applying a force tending to restrict rotation of the pivot frame 222 relative to the support arm frame 220. Rotation of the sphere 232 will enable the pivot frame 222 to be rotated relative to the support arm frame 220. However, the force of the sphere 232 against the arcuate flange 240 can be adjusted based upon the force exerted by the spring 228 against the housing 236. Precise positioning of the pivot frame 222 relative to the support arm frame 220 can be provided by seating the sphere 232 in the stop 242.

The vehicular pivot mirror assembly 10 described herein is an improvement over the prior art in that bearing surfaces between the pivot frame and the support arm frame remain planar. Wear between the bearing surfaces is reduced, and the connection of the pivot frame to the support arm frame remains unchanged overtime. Consequently, vibration of the reflective element assembly is reduced. Furthermore, the vehicular pivot mirror assembly 10 can be operated as either a manual mirror or a power-driven mirror with the addition of a well known electrical motor drive assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicular mirror assembly, comprising:
   a base for attaching the vehicular mirror assembly to a motor vehicle;
   a reflective element assembly;
   a support arm attached to the base and the reflective element assembly;
   a pivot connection coupling the reflective element assembly to the support arm and enabling the reflective element assembly to be rotated about a first axis between a first position and a second position relative to the support arm, the pivot connection comprising:
      at least one annular cavity in coaxial association with at least one annular wall; and
      at least one bearing sleeve associated with at least one of the support arm and the reflective element assembly;
   a retainer assembly comprising:
   at least one flanged bearing sleeve to retain the at least one annular cavity in coaxial association with the at least one annular wall and prevent axial movement of the reflective element assembly relative to the support arm; and
   a press-fit ring received on one of the support arm and the reflective element assembly and encapsulating at least one bearing sleeve between the retainer and the other of the support arm and the reflective element assembly; and
   a clutch assembly interposed between the reflective element assembly and the support arm for maintaining the reflective element assembly in one of the first position and the second position and permitting rotation of the reflective element assembly relative to the support arm between the first and second positions, the clutch assembly being rotatable about a second axis transverse to the first axis.

2. The vehicular mirror assembly of claim 1 wherein the press-fit ring encapsulates a pair of juxtaposed bearing sleeves between the retainer and the other of the support arm and the reflective element assembly.

3. The vehicular mirror assembly of claim 2 wherein the clutch assembly comprises a threaded shaft associated with one of the reflective element assembly and the support arm and a follower nut received on the threaded shaft and associated with the other of the reflective element assembly and the support arm, wherein linear movement of the follower nut along the threaded shaft is translated into pivotal movement of the reflective element assembly with respect to the support arm.

4. The vehicular mirror assembly of claim 3 and further comprising a motive-producing element connected to the threaded shaft for introducing rotation to the threaded shaft, and causing the nut follower to travel along the threaded shaft.

5. The vehicular mirror assembly of claim 4 wherein the clutch assembly further comprises a slip clutch located between the threaded shaft and the motive-producing element.

6. The vehicular mirror assembly of claim 1 wherein the clutch assembly comprises a threaded shaft associated with one of the reflective element assembly and the support arm and a follower nut received on the threaded shaft and associated with the other of the reflective element assembly and the support arm, wherein linear movement of the follower nut along the threaded shaft is translated into pivotal movement of the reflective element assembly with respect to the support arm.

7. The vehicular mirror assembly of claim 6 and further comprising a motive-producing element connected to the threaded shaft for introducing rotation to the threaded shaft, and causing the nut follower to travel along the threaded shaft.

8. The vehicular mirror assembly of claim 7 wherein the clutch assembly further comprises a slip clutch located between the threaded shaft and the motive-producing element.

* * * * *